United States Patent
Kawamura et al.

(10) Patent No.: US 9,949,467 B2
(45) Date of Patent: Apr. 24, 2018

(54) FISHING LINE GUIDE

(71) Applicant: GLOBERIDE, INC., Higashi Kurume-shi, Tokyo (JP)

(72) Inventors: Takuji Kawamura, Tokyo (JP); Takuki Nakamura, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 14/345,323

(22) PCT Filed: Jul. 11, 2013

(86) PCT No.: PCT/JP2013/068974
§ 371 (c)(1),
(2) Date: Mar. 17, 2014

(87) PCT Pub. No.: WO2014/013930
PCT Pub. Date: Jan. 23, 2014

(65) Prior Publication Data
US 2015/0201594 A1 Jul. 23, 2015

(30) Foreign Application Priority Data

Jul. 19, 2012 (JP) .................................. 2012-160351

(51) Int. Cl.
*A01K 87/04* (2006.01)
*A01K 87/00* (2006.01)

(52) U.S. Cl.
CPC ............ *A01K 87/04* (2013.01); *A01K 87/00* (2013.01)

(58) Field of Classification Search
CPC ........ A01K 87/04; A01K 87/00; A01K 97/12; A01K 97/00

(Continued)

(56) References Cited

U.S. PATENT DOCUMENTS 676,554 A * 6/1901 Friedlander ............ A01K 87/04
43/24
2,601,351 A * 6/1952 Wilburn ................. A01K 87/02
403/300

(Continued)

FOREIGN PATENT DOCUMENTS

JP 56-24874 3/1981
JP 09-131148 5/1997

(Continued)

OTHER PUBLICATIONS

European Search Report dated Apr. 2, 2015 for Appln. No. 13819879.1.

(Continued)

*Primary Examiner* — Kathleen I Alker
*Assistant Examiner* — Jeffrey R Larsen
(74) *Attorney, Agent, or Firm* — Pillsbury Winthrop Shaw Pittman, LLP (57) ABSTRACT

Provided is a fishing line guide that can be manufactured in a simple manner. The fishing line guide according to an embodiment is a fishing line guide mounted on a tip portion of a fishing rod, the fishing line guide including a tubular member where a through-hole extending along an extension direction is formed, a plurality of slits extending while facing each other along the extension direction on an end surface of one end being formed in the tubular member, and a frame member where a through-hole allowing a fishing line to be inserted and guided is formed, a supporting portion engaged with the through-hole and the plurality of slits of the tubular member being formed in the frame member.

20 Claims, 6 Drawing Sheets

(58) Field of Classification Search
USPC .................................... 43/24, 18.1 R, 16, 17
See application file for complete search history.

(56) References Cited

U.S. PATENT DOCUMENTS

| | | | | |
|---|---|---|---|---|
| 3,170,721 | A * | 2/1965 | Wells | A01K 87/02 403/377 |
| 5,855,084 | A | 1/1999 | Huddleston et al. | |
| 6,067,743 | A * | 5/2000 | Ohmura | A01K 87/04 43/24 |
| 6,360,475 | B1 * | 3/2002 | Lepage | A01K 87/00 43/18.1 R |
| 7,653,976 | B1 * | 2/2010 | Kirk | A01K 87/00 29/402.01 |
| 2006/0032107 | A1 * | 2/2006 | Yu | A01K 87/04 43/24 |

FOREIGN PATENT DOCUMENTS

| | | |
|---|---|---|
| JP | 2003-274808 | 9/2003 |
| JP | 2007-006767 | 1/2007 |
| JP | 2007-289105 A | 11/2007 |
| KR | 20-2000-0013904 Y1 | 7/2000 |

OTHER PUBLICATIONS

International Search Report for PCT/JP2013/068974.
Japanese Office Action dated Oct. 27, 2015 for Appln. No. 2012-160351.
Chinese Office Action dated Oct. 15, 2014 for Appln. No. 201380003225.6.
Taiwanese Office Action dated Mar. 9, 2016 for Appln. No. 102124114.
Non-final Office Action Korean Patent Application No. 10-2014-7000458 dated Feb. 7, 2018 with English translation.

\* cited by examiner

FISHING LINE GUIDE

CROSS-REFERENCE TO RELATED APPLICATIONS

This is the U.S. National Stage of PCT/JP2013/068974, filed Jul. 11, 2013, which in turn claims priority to Japanese Patent Application No. 2012-160351, filed Jul. 19, 2012, the entire contents of all applications are incorporated herein by reference in their entireties.

TECHNICAL FIELD

The present invention relates to a fishing line guide for guiding a fishing line.

BACKGROUND ART

Japanese Unexamined Patent Application Publication No. 9-131148 ("PTL 1") describes a known fishing line guide that is mounted on a tip portion of a fishing rod to guide a fishing line. The fishing line guide described in PTL 1 includes a frame member that holds an annular member configured to allows the fishing line to be inserted therein and guided therethrough, and a pipe member that is used to mount the frame member on the tip portion of the fishing rod. One end of the cylindrical pipe member is pressed into a constricted shape and has a rectangular-shaped opening. By inserting a tongue-shaped insertion portion that is formed in the frame member into the rectangular-shaped opening of the pipe member, the frame member and the pipe member are coupled.

CITATION LIST

Patent Literature

PTL 1: Japanese Unexamined Patent Application Publication No. 9-131148

SUMMARY

Technical Problem

However, in order to manufacture the fishing line guide described in PTL 1, a complicated pressing process is required to be performed on the pipe member such that the one end of the pipe member has the rectangular-shaped opening. There is a need to provide a fishing line guide that can be manufactured more simply.

According to various embodiments of the present invention, a fishing line guide that can be manufactured in a simple manner is provided.

Solution to Problem

According to an aspect of the present invention, there is provided a fishing line guide mounted on a tip portion of a fishing rod, the fishing line guide including a tubular member where a through-hole extending along an extension direction is formed, a plurality of slits extending while facing each other along the extension direction on an end surface of one end being formed in the tubular member, and a frame member where a through-hole allowing a fishing line to be inserted and guided is formed, a supporting portion engaged with the through-hole and the plurality of slits of the tubular member being formed in the frame member.

Advantageous Effects of Invention

According to various embodiments of the present invention, it is possible to provide a fishing line guide that can be manufactured in a simple manner.

DESCRIPTION OF EMBODIMENTS

Hereinafter, various embodiments will be described with reference to the accompanying drawings. The same reference numerals are applied to the same elements in the drawings. In addition, for convenience, each of the drawings may not necessarily be illustrated in the same scale.

Figure 1:
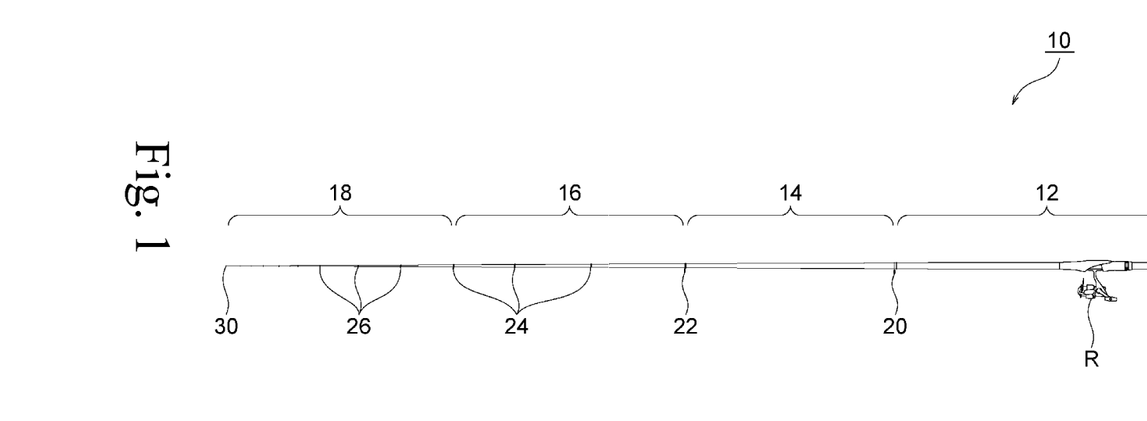
FIG. 1 is a side view illustrating a configuration of a fishing rod on which a fishing line guide according to an embodiment of the present invention is mounted.

FIG. 1 is a side view illustrating a configuration of a fishing rod on which a fishing line guide according to an embodiment of the present invention is mounted. As illustrated in FIG. 1, a fishing rod (fishing rod main body) 10 may include a base rod 12 on which a reel R may be mounted, an intermediate rod 14 that may be connected to the base rod 12, an additional intermediate rod 16 that may be connected to the intermediate rod 14, and a top rod 18 that may be connected to the additional intermediate rod 16. The fishing rod 10 may be, as an example, a so-called telescopic rod in which the intermediate rod 14, the additional intermediate rod 16, and the top rod 18 may be sequentially accommodated in the base rod 12.

Fishing line guides that may guide a fishing line which may be pulled out from the reel R may be mounted on these rods. For example, a fishing line guide 20 may be mounted on the base rod 12, a fishing line guide 22 may be mounted on the intermediate rod 14, and a fishing line guide 24 and a fishing line guide 26 may be respectively mounted on the additional intermediate rod 16 and the top rod 18 in the same manner. In addition, a fishing line guide (may be referred to as a "top guide") 30 according to this embodiment may be mounted on a tip portion of the top rod 18.

Figure 2:
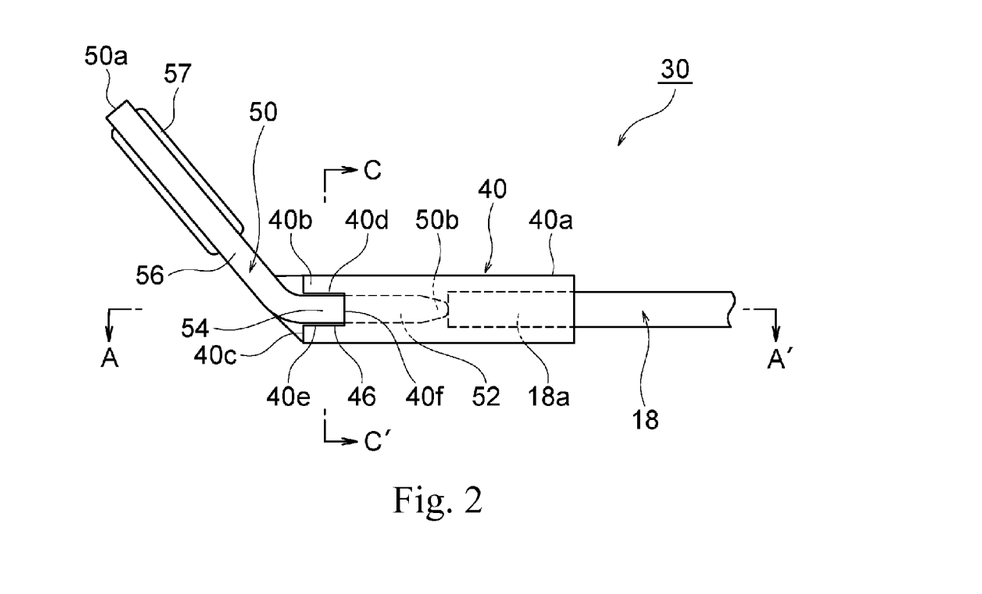
FIG. 2 is a side view illustrating a configuration of the fishing line guide according to the embodiment of the present invention.
Figure 3:
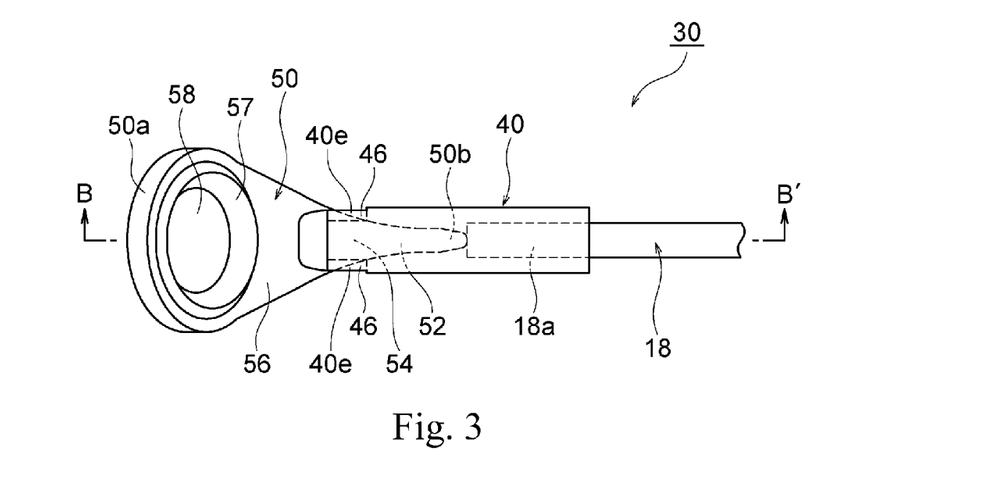
FIG. 3 is a top view illustrating the configuration of the fishing line guide of FIG. 2.
Figure 4:
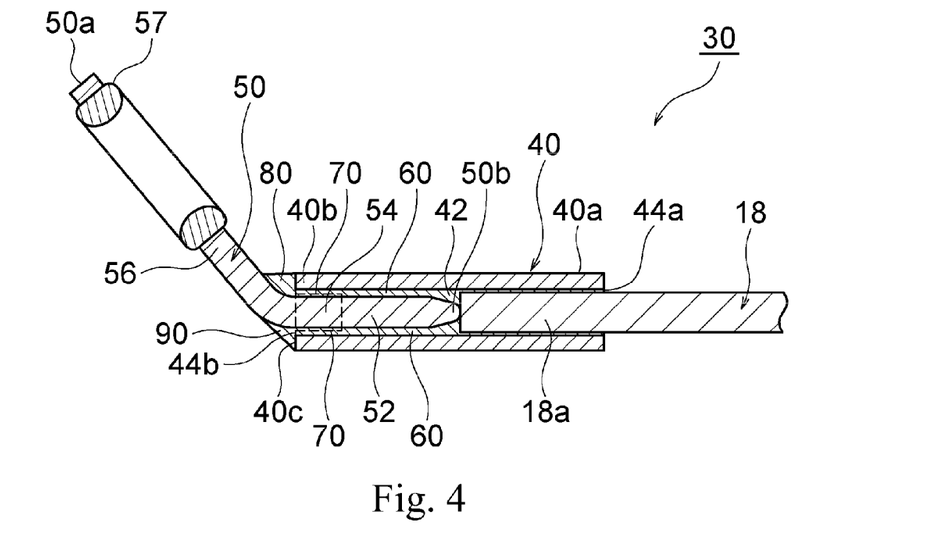
FIG. 4 is a sectional view illustrating the fishing line guide of FIG. 3 taken along line B-B'.
Figure 5:
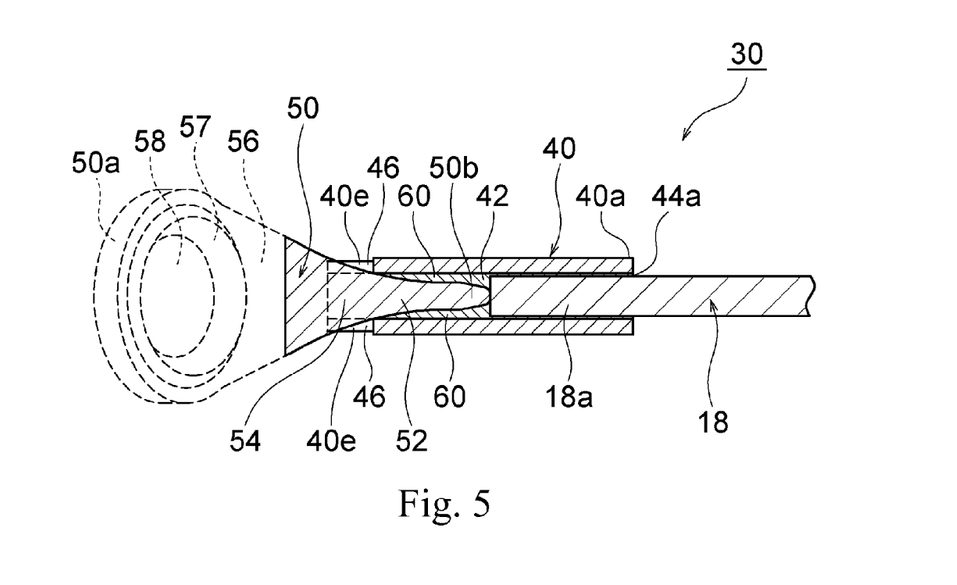
FIG. 5 is a sectional view illustrating the fishing line guide of FIG. 2 taken along line A-A'.
Figure 6:
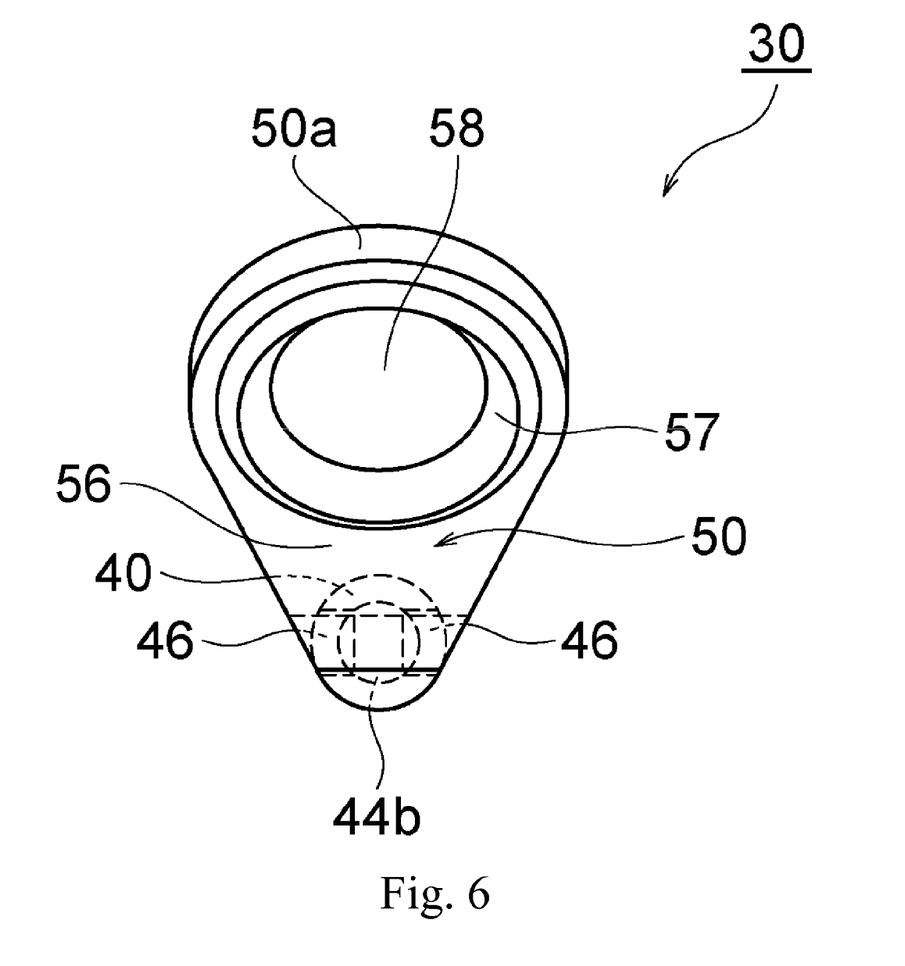
FIG. 6 is a front view illustrating the configuration of the fishing line guide of FIG. 2.
Figure 7:
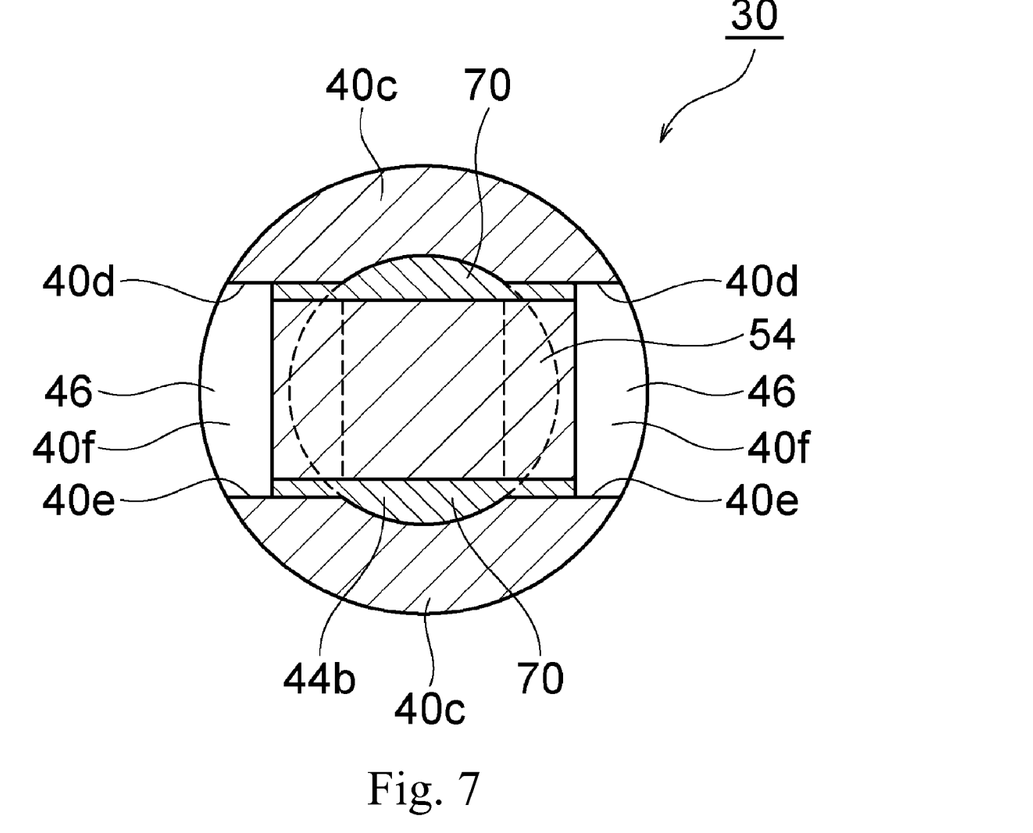
FIG. 7 is a sectional view illustrating the fishing line guide of FIG. 2 taken along line C-C'.

The fishing line guide (top guide) 30 will be described in detail with reference to FIGS. 2 to 7. FIG. 2 is a side view illustrating a configuration of the fishing line guide according to the embodiment of the present invention. FIG. 3 is a top view illustrating the configuration of the fishing line guide of FIG. 2. FIG. 4 is a sectional view illustrating the fishing line guide of FIG. 3 taken along line B-B'. FIG. 5 is a sectional view illustrating the fishing line guide of FIG. 2 taken along line A-A'. FIG. 6 is a front view illustrating the configuration of the fishing line guide of FIG. 2. FIG. 7 is a sectional view illustrating the fishing line guide of FIG. 2 taken along line C-C'.

As illustrated in FIGS. 2 to 6, the fishing line guide 30 may include mainly a tubular member 40 and a frame member 50 that may be fixed to the tubular member.

First, a configuration of the tubular member 40 will be described.

The tubular member 40 may have a tubular shape and a through-hole 42 that may extend along an extension direction thereof may be formed therein. The through-hole 42 may be formed to have a substantially constant inner diameter from one end 40a of the tubular member 40 to the other end 40b. A tip portion 18a of the top rod 18 may be accommodated in the through-hole 42 from an opening 44a that may be formed at the one end 40a of the tubular member 40. For example, the top rod 18 may be fixed to the tubular member 40 as an adhesive is applied between an inner surface of the through-hole 42 of the tubular member 40 and an outer surface of the tip portion 18a of the top rod 18.

Regarding the other end 40b of the tubular member 40, a plurality of (for example, two herein) slits (notches) 46 that may extend along the extension direction of the tubular member 40 while facing each other may be formed on an end surface 40c of the other end 40b. As illustrated in FIGS. 2 to 7, each of the two slits 46 may be surrounded by two supporting surfaces 40d and 40e that may extend while facing each other at the other end 40b of the tubular member 40 and a supporting surface 40f that may extend adjacent to the two supporting surfaces 40d and 40e. In other words, each of the slits 46 may be defined by the three supporting surfaces 40d, 40e, and 40f at the other end 40b of the tubular member 40.

As illustrated in FIGS. 6 and 7, each of the slits 46 may be adjacent to and may communicate with an opening 44b that may be formed at the other end 40b of the tubular member 40.

As illustrated in FIGS. 2 to 7 in this embodiment, each of the slits 46 may be formed to extend in substantially parallel with the extension direction of the tubular member 40. Specifically, each of the slits 46 may be formed such that the supporting surface 40d and the supporting surface 40e may extend in substantially parallel with each other and to be substantially parallel with the extension direction of the tubular member 40.

The tubular member 40 may be formed of a fiber-reinforced resin (where a fiber-reinforced resin having a shape of a plurality of sheets may be laminated) in which a reinforced fiber such as glass and carbon is impregnated with a resin. For example, the tubular member 40 can be formed by winding a plate-shaped fiber-reinforced resin by a plurality of times. Furthermore, the tubular member 40 may be integrally molded by using various metals such as titanium and aluminum and various resins such as epoxy resin, polyamide resin, and phenolic resin. In addition, the slit 46 can be formed with ease by cutting an end surface of the tubular member 40 with an edged tool, a cutting machine, or the like.

Next, a configuration of the frame member 50 will be described.

As illustrated in FIGS. 2 to 6, the frame member 50 may be formed of a plate-shaped member that may, for example, have a width gradually decreasing from one end 50a toward the other end 50b and may be bent in the vicinity of a central portion. Specifically, the frame member 50 may generally have a plate-shaped first supporting portion 52 that may be inserted into the through-hole 42 from the opening 44b of the tubular member 40 to be accommodated therein, a plate-shaped second supporting portion 54 that may be formed in one piece with the first supporting portion 52, may have a width wider than the first supporting portion 52, and may be engaged with the two slits 46 of the tubular member 40, and a plate-shaped main body portion 56 that may be formed in one piece with the second supporting portion 54, may have a width wider than the second supporting portion 54, may extend obliquely with respect to the second supporting portion 54, and may have a through-hole 58 formed therein.

As an example in this embodiment, the frame member 50 may have a substantially constant thickness from the one end 50a to the other end 50b. In other words, the first supporting portion 52, the second supporting portion 54, and the main body portion 56 may be formed to maintain substantially the same thickness.

As illustrated in FIGS. 4 and 5, the first supporting portion 52 may be formed to have a width and a thickness that may be smaller than an inner diameter of the through-hole 42 so that the first supporting portion 52 can be accommodated in the through-hole 42 of the tubular member 40. The first supporting portion 52 may be formed to have a width that may increase from a front end toward a rear end.

As is the case with the first supporting portion 52, the second supporting portion 54 may be formed to have a thickness that may be smaller than the inner diameter of the through-hole 42 so that the second supporting portion 54 can be accommodated in the through-hole 42 of the tubular member 40. In addition, the second supporting portion 54 may be formed to have a width (width that may increase from a front end toward a rear end) that may be larger than the inner diameter of the through-hole 42. Specifically, the second supporting portion 54 may be formed to have a width that can face the supporting surface 40e (and the supporting surface 40d) of the tubular member 40 at least in part, that is, a width with which the supporting surface 40e (and the supporting surface 40d) can be covered at least in part.

The main body portion 56 may be formed to have a width that may increase from a front end toward a rear end. The main body portion 56 may be shaped to be bent at the front end and to extend obliquely with respect to the second supporting portion 54 (and the first supporting portion 52). The main body portion 56 may hold an annular supporting member (may be referred to as a "guide ring") 57 that may have the through-hole 58 at the rear end. The annular supporting member 57 may serve to insert the fishing line into the through-hole 58 and guide the fishing line.

The frame member 50 may be formed of a fiber-reinforced resin (where a fiber-reinforced resin having a shape of a plurality of sheets may be laminated) in which a reinforced fiber such as glass and carbon is impregnated with a resin. Furthermore, the frame member 50 may be integrally molded by using various metals such as titanium and aluminum and various resins such as epoxy resin, polyamide resin, and phenolic resin.

Next, mounting of the frame member 50 on the tubular member 40 will be described.

First, referring to FIG. 4, a tip of the first supporting portion 52 of the frame member 50 may be inserted into the through-hole 42 of the tubular member 40 from the opening 44b that may be formed at the other end 40b of the tubular member 40 (at this point of time, the top rod 18 may not be mounted on the tubular member 40). The first supporting portion 52 may be moved in the through-hole 42 as it is and a side surface thereof may abut against the inner surface of the through-hole 42 (state illustrated in FIG. 5), and cannot be moved any more in the through-hole 42. In this state, as illustrated in FIGS. 2, 5, and 7, a part (edge portion) of a lower surface of the second supporting portion 54 may face (or abut against) the supporting surface 40e of the tubular member 40, and a part (edge portion) of an upper surface of the second supporting portion 54 may face (or abut against) the supporting surface 40d of the tubular member 40. In this manner, a movement of the second supporting portion 54 (in addition, the entire frame member 50) in an up-down direction thereof may be regulated by these supporting surfaces. In other words, as the second supporting portion 54 may be engaged with the two slits 46 of the tubular member 40 (the second supporting portion 54 may be pinched by the supporting surface 40d and the supporting surface 40e of the tubular member 40), the movement of the second supporting portion 54 (and the entire frame member 50) in the up-down direction thereof may be regulated by the slits 46.

Furthermore, as illustrated in FIGS. 4 and 5 in this embodiment, cushioning material 60 may be arranged between an outer surface (that is, an upper surface, a lower surface, a side surface, and the like) of the first supporting portion 52 and the inner surface of the through-hole 42 of the tubular member 40. Examples of the cushioning material 60 that may be used may include an adhesive (for example, epoxy resin adhesive) and a resin.

In addition, as illustrated in FIGS. 4 to 7, a cushioning material 70 may be arranged also between an outer surface (that is, an upper surface and a lower surface) of the second supporting portion 54 and the inner surface of the through-hole 42 of the tubular member 40 and the supporting surfaces 40d and 40e. The same examples as the cushioning material 60 can be used as the cushioning material 70.

The cushioning material 60 (cushioning material 70) may serve, first of all, to increase a coupling force between the first supporting portion 52 (second supporting portion 54) and the tubular member 40. Furthermore, the cushioning material 60 (cushioning material 70) may serve to absorb a displacement of the first supporting portion 52 (the second supporting portion 54) in the up-down direction. Specifically, the main body portion 56 may be displaced in the up-down direction as, for example, the fishing line is moved while being in contact with the annular supporting member 57 or as the main body portion 56 collides with an object. In this case, the first supporting portion 52 (second supporting portion 54) may also be displaced in the up-down direction due to the movement of the main body portion 56. In this case, the cushioning material 60 (cushioning material 70) may be contracted to absorb the displacement of the first supporting portion 52 (second supporting portion 54). In this manner, a situation in which the first supporting portion 52 (second supporting portion 54) and the tubular member 40 may be damaged due to a rapid movement of the main body portion 56 can be suppressed.

Moreover, as illustrated in FIG. 4 in this embodiment, an embedded material 80 may be arranged between an upper surface of the main body portion 56 and the end surface 40c of the tubular member 40 so as to fill a step that may be generated between the upper surface of the main body portion 56 of the frame member 50 and the end surface 40c of the other end 40b of the tubular member 40. An adhesive, a resin, and the like can be used as the embedded material 80. Alternatively, the tubular member 40 itself may constitute the embedded material 80 through processing (fusion welding, welding, or the like) of the end surface 40c of the tubular member 40.

Alternatively or in addition thereto, as illustrated in FIG. 4, an embedded material 90 may be arranged also between a lower surface of the main body portion 56 and the end surface 40c of the tubular member 40 so as to fill a step that may be generated between the lower surface of the main body portion 56 of the frame member 50 and the end surface 40c of the other end 40b of the tubular member 40. The embedded material 90 can be formed in the same manner as the embedded material 80.

Figure 8:
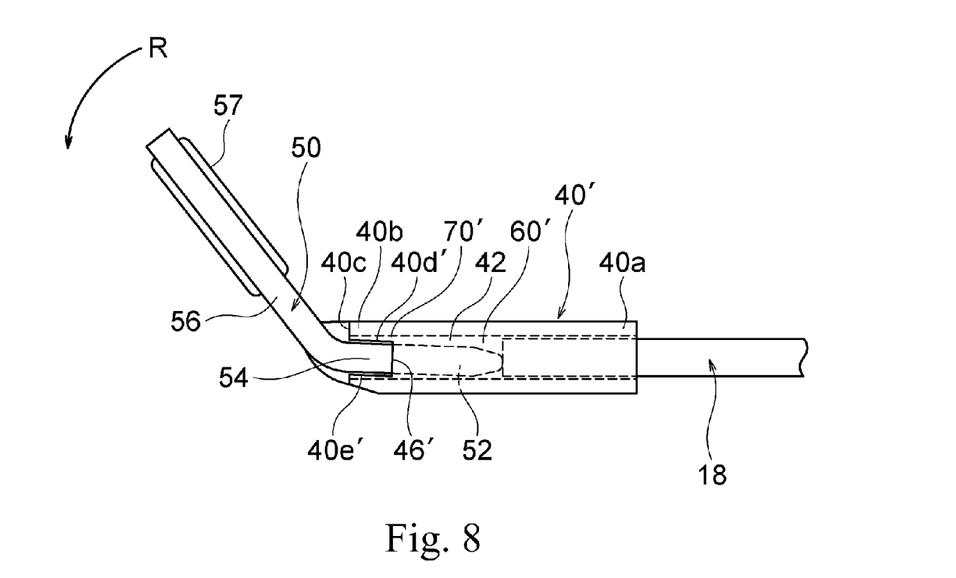
FIG. 8 is a side view illustrating a configuration of a fishing line guide according to another embodiment of the present invention.

FIG. 8 is a side view illustrating a configuration of a fishing line guide according to another embodiment of the present invention. In FIG. 8, the same reference numerals are applied to the same elements as illustrated in FIG. 2 and description thereof will be omitted.

As is the case with the tubular member 40 illustrated in FIG. 2, a tubular member 40' according to this embodiment may have two slits 46' formed on the end surface 40c of the other end 40b. However, unlike the slits 46 illustrated in FIG. 2, the slits 46' may be formed to extend obliquely downward with respect to an extension direction of the tubular member 40'. Specifically, a supporting surface 40d' and a supporting surface 40e' that may surround the slits 46' of the tubular member 40' may be formed to extend obliquely downward with respect to the extension direction of the tubular member 40'. In this manner, a gap between the inner surface of the through-hole 42 of the tubular member 40' and the upper surface (lower surface) of the second supporting portion 54 and the upper surface (lower surface) of the first supporting portion 52 may have a height which may increase (decrease) from the other end 40b of the tubular member 40' toward the one end 40a. This may mean an increase in the volume of a cushioning material 70' (cushioning material 60') that may be arranged between the inner surface of the through-hole 42 of the tubular member 40' and the upper surface of the second supporting portion 54 (upper surface of the first supporting portion 52). In this manner, the cushioning material 70' (cushioning material 60') can more effectively reduce the displacement of the second supporting portion 54 (first supporting portion 52) which may be caused by the displacement of the main body portion 56 in the direction illustrated with an arrow R.

In addition, an angle that the annular supporting member 57 may form with respect to the extension direction of the tubular member 40' can be adjusted by adjusting an angle such that the slit 46' forms with respect to the extension direction of the tubular member 40'. In this manner, guiding of the fishing line by the annular supporting member 57 can be improved.

FIG. 8 illustrates an example in which the slits 46' are formed to extend obliquely downward with respect to the extension direction of the tubular member 40', but the slits 46' may be formed to extend obliquely upward with respect to the extension direction of the tubular member 40'. In this case, contrary to the configuration illustrated in FIG. 8, the displacement of the second supporting portion 54 (first supporting portion 52) which may be caused by the displacement of the main body portion 56 in a direction opposite to the direction illustrated with the arrow R can be more effectively reduced.

Figure 9:
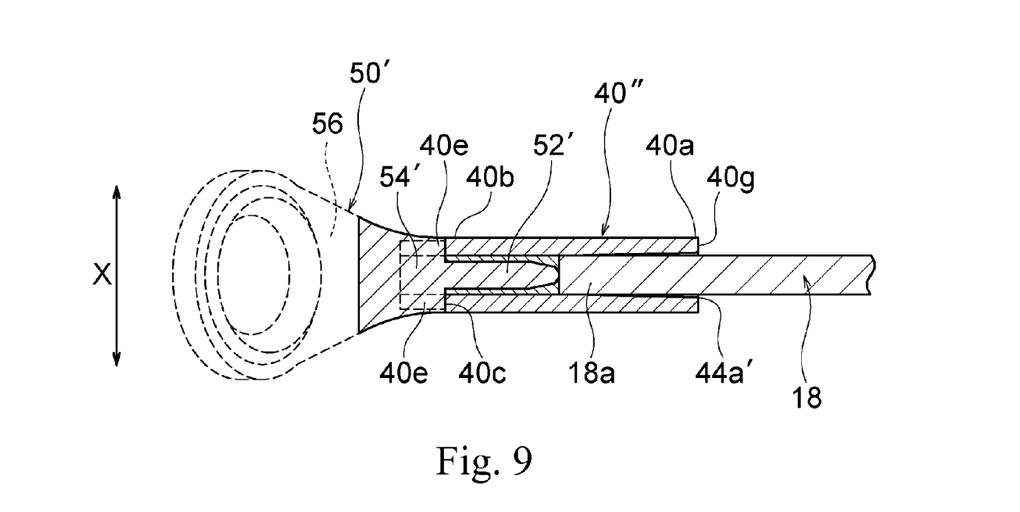
FIG. 9 is a sectional view illustrating a configuration of a fishing line guide according to still another embodiment of the present invention viewed from an upper surface.

FIG. 9 is a sectional view illustrating a configuration of a fishing line guide according to still another embodiment of the present invention viewed from an upper surface. In FIG.

9, the same reference numerals are applied to the same elements as illustrated in FIG. 5 and description thereof will be omitted.

A second supporting portion 54' may have a side surface that may be smoothly connected with an outer surface of a tubular member 40". In this manner, a lower surface (upper surface) of the second supporting portion 54' may completely cover the supporting surface 40e (supporting surface 40d) of the tubular member 40".

As a result, the fishing line guide according to this embodiment may enhance the aesthetically pleasing appearance. In addition, because no step is generated between a side surface of the second supporting portion 54' and an outer surface of the tubular member 40", a situation in which the fishing line may be entangled with such a step can be suppressed.

Furthermore, an end surface of a front end of the second supporting portion 54' may form an abutting surface that may abut against the end surface 40c of the other end 40b of the tubular member 40". In this manner, coupling between a frame member 50' and the tubular member 40" can be effectively maintained even in a case where the main body portion 56 is subject to an external force along a direction crossing an extension direction of the tubular member 40" (for example, a direction X orthogonal to the extension direction of the tubular member 40" as illustrated in FIG. 9).

Moreover, the tubular member 40" may have an inner diameter that may increase toward an end surface 40g of the one end 40a. For example, as illustrated in FIG. 9, the tubular member 40" may have a substantially constant inner diameter between the other end 40b and the vicinity of a central portion and may have an inner diameter that may increase toward the one end 40a between the vicinity of the central portion and the one end 40a. In this manner, the tip portion 18a of the top rod 18 can be inserted more simply into an opening 44a' that may be formed at the one end 40a of the tubular member 40" (this opening may be larger than the opening 44a illustrated in FIG. 5).

According to the various embodiments as described above, the plurality of slits that may extend while facing each other may be formed on the end surface of the one end of the tubular member, the tip portion of the frame member may be accommodated in the through-hole of the tubular member, and the tip portion of the frame member may be engaged with the plurality of slits of the tubular member such that the tubular member and the frame member may be coupled. In this manner, it is possible to provide the fishing line guide that can be manufactured in a simple manner.

In addition, since the tip portion of the frame member is pinched by each of the plurality of slits of the tubular member, bonding strength between the frame member and the tubular member can be improved.

Furthermore, because it is generally difficult to perform twist processing on a fiber-reinforced resin, it is considered to be difficult to form both the tubular member and the frame member with the fiber-reinforced resin in a case where the fishing line guide is formed by using the fiber-reinforced resin. However, the fishing line guide according to the various embodiments described above may not entail any problem in forming both the tubular member and the frame member with the fiber-reinforced resin since the fishing line guide may be manufactured by forming the plurality of slits in the tubular member and engaging the frame member with these slits. In this manner, both the tubular member and the frame member may be formed of the fiber-reinforced resin, and it is possible to provide the fishing line guide which may be capable of having an improved strength and being reduced in weight.

In addition, in the various embodiments described above, a case where the "two" slits that may extend while facing each other along the extension direction of the tubular member may be formed in the tubular member has been described, but "three or more" slits that may extend while facing each other along the extension direction of the tubular member may be formed in the tubular member. In this case, it may be preferable that the frame member be shaped to be engaged with all of the three or more slits.

In addition, in the various embodiments described above, resistance of the tubular member to external damage can be increased and an external appearance of the tubular member can be improved by applying a resin such as an epoxy resin to the outer surface of the tubular member.

The invention claimed is:

1. A fishing line guide configured for mounting on a tip portion of a fishing rod, the fishing line guide comprising:
   a tubular member having a through-hole extending along an extension direction, the tubular member having a plurality of slits extending along the extension direction on an end surface of one end of the tubular member and positioned so as to face each other, each of the plurality of slits being defined by at least two supporting surfaces that are substantially parallel with the extension direction and face each other, and the tubular member configured to accommodate the tip portion of the fishing rod in its through-hole at an opposite end; and
   a frame member having a line-guiding hole and a supporting portion, in which the line-guiding hole is configured to allow a fishing line to be inserted and guided therethrough, and wherein the supporting portion is engaged with the plurality of slits of the tubular member;
   wherein the supporting portion includes a plate-shaped first supporting portion and a plate-shaped second supporting portion, the plate-shaped first supporting portion having a first width smaller than an inner diameter of the through-hole of the tubular member that is inserted and accommodated in the through-hole of the tubular member at its one end, the plate-shaped second supporting portion having a part that increases to a second width that is larger than the first width of the first supporting portion and the inner diameter of the through-hole of the tubular member such that the part of the second supporting portion having the larger, second width faces the at least two supporting surfaces of the plurality of slits at least in part, and
   wherein movement of the frame member in a direction that is perpendicular to the extension direction is configured to be regulated by the plurality of slits of the tubular member.

2. The fishing line guide according to claim 1,
   wherein the frame member further comprises:
   the second supporting portion being formed in one piece with the first supporting portion; and
   a plate-shaped main body portion being formed in one piece with the second supporting portion, extending obliquely with respect to the second supporting portion, and having the line-guiding hole.

3. The fishing line guide according to claim 2, further comprising an embedded material arranged between an upper surface or a lower surface of the main body portion of the frame member and an end surface of the one end of the tubular member.

4. The fishing line guide according to claim 1, further comprising a cushioning material arranged between an inner surface of the through-hole of the tubular member and an outer surface of the first supporting portion of the frame member.

5. The fishing line guide according to claim 1, further comprising a cushioning material arranged between a plurality of supporting surfaces and an outer surface of the second supporting portion of the frame member.

6. The fishing line guide according to claim 1,
wherein an upper surface of the second supporting portion and an upper surface of the first supporting portion of the frame member extend in a substantially parallel direction with an inner surface of the through-hole of the tubular member.

7. The fishing line guide according to claim 1,
wherein an upper surface of the second supporting portion and an upper surface of the first supporting portion of the frame member extend obliquely with respect to an inner surface of the through-hole of the tubular member.

8. The fishing line guide according to claim 1,
wherein the second supporting portion of the frame member has a side surface smoothly connected with an outer surface of the tubular member.

9. The fishing line guide according to claim 1,
wherein the tubular member has an inner diameter that increases toward an end surface of its opposite end.

10. The fishing line guide according to claim 1, wherein the second supporting portion has an abutting surface that abuts against the end surface of the one end of the tubular member.

11. A fishing rod comprising:
a fishing rod main body; and
a fishing line guide mounted on a tip portion of the fishing rod main body, the fishing line guide comprising:
    a tubular member having a through-hole extending along an extension direction that extends in a longitudinal direction of the rod, the tubular member having a plurality of slits extending along the extension direction on an end surface of one end of the tubular member and positioned so as to face each other, each of the plurality of slits being defined by at least two supporting surfaces that are substantially parallel with the extension direction and face each other, and the tip portion of the fishing rod main body being inserted into the through-hole from the other, opposite end of the tubular member in the fishing line guide, and
    a frame member having a line-guiding hole and a supporting portion, in which the line-guiding hole is configured to allow a fishing line to be inserted and guided therethrough, and wherein the supporting portion is engaged with the line guiding hole and the plurality of slits of the tubular member;
    wherein the supporting portion includes a first supporting portion and a second supporting portion, the first supporting portion having a first width smaller than an inner diameter of the through-hole of the tubular member that is inserted and accommodated in the through-hole of the tubular member at its one end, the second supporting portion having a part that increases to a second width that is larger than the first width of the first supporting portion and the inner diameter of the through-hole of the tubular member such that the part of the second supporting portion having the larger, second width faces the at least two supporting surfaces of the plurality of slits at least in part, and
    wherein movement of the frame member in a direction that is perpendicular to the extension direction is configured to be regulated by the plurality of slits of the tubular member.

12. The fishing rod according to claim 11, wherein the frame member further comprises a main body portion, formed in one piece with the second supporting portion, that extends obliquely with respect to the second supporting portion and has the line-guiding hole therein.

13. The fishing rod according to claim 12, further comprising an embedded material arranged between an upper surface or a lower surface of the main body portion of the frame member and an end surface of the one end of the tubular member.

14. The fishing rod according to claim 11, further comprising a cushioning material arranged between an inner surface of the through-hole of the tubular member and an outer surface of the first supporting portion of the frame member.

15. The fishing rod according to claim 11, further comprising a cushioning material arranged between a plurality of supporting surfaces and an outer surface of the second supporting portion of the frame member.

16. The fishing rod according to claim 11, wherein an upper surface of the second supporting portion and an upper surface of the first supporting portion of the frame member extend in a substantially parallel direction with an inner surface of the through-hole of the tubular member.

17. The fishing rod according to claim 11, wherein an upper surface of the second supporting portion and an upper surface of the first supporting portion of the frame member extend obliquely with respect to an inner surface of the through-hole of the tubular member.

18. The fishing rod according to claim 11, wherein the second supporting portion of the frame member has a side surface smoothly connected with an outer surface of the tubular member.

19. The fishing rod according to claim 11, wherein the tubular member has an inner diameter that increases toward an end surface of its opposite end.

20. The fishing rod according to claim 11, wherein the second supporting portion has an abutting surface that abuts against the end surface of the one end of the tubular member.

* * * * *